United States Patent [19]
Takeuchi

[11] Patent Number: 5,657,628
[45] Date of Patent: Aug. 19, 1997

[54] SECONDARY AIR SUPPLY SYSTEM FOR ENGINE

[75] Inventor: Yoshihiko Takeuchi, Iwata, Japan

[73] Assignee: Yamaha Hatsudoki Kabushiki Kaisha, Iwata, Japan

[21] Appl. No.: 507,731

[22] Filed: Jul. 26, 1995

[30] Foreign Application Priority Data

Jul. 27, 1994 [JP] Japan ................................ 6-196023

[51] Int. Cl.$^6$ ................................................ F01N 3/30
[52] U.S. Cl. ................................ 60/293; 180/219
[58] Field of Search ................ 60/293, 305; 180/219

[56] References Cited

U.S. PATENT DOCUMENTS

| | | | |
|---|---|---|---|
| 4,069,666 | 1/1978 | Nakamura | 60/293 |
| 4,179,883 | 12/1979 | Nishiyama | 60/293 |
| 4,354,570 | 10/1982 | Tahaka | 180/219 |
| 4,387,565 | 6/1983 | Otani et al. | 60/293 |
| 4,417,442 | 11/1983 | Ikenoya et al. | 60/293 |
| 4,434,615 | 3/1984 | Ikenoya | 60/293 |
| 4,454,714 | 6/1984 | Ikenoya et al. | 60/293 |

FOREIGN PATENT DOCUMENTS

| | | | |
|---|---|---|---|
| 34013 | 3/1978 | Japan | 60/293 |
| 46009 | 3/1980 | Japan | 60/293 |
| 41917 | 2/1987 | Japan | 60/293 |
| 2027125 | 2/1980 | United Kingdom . | |

OTHER PUBLICATIONS

Patent Abstracts of Japan, vol. 7, No. 193 (M-238), 24 Aug. 1983.
Patent Abstracts of Japan, vol. 11, No. 135 (M-585), 28 Apr. 1987
European Search Report dated Jun. 26, 1996.

*Primary Examiner*—Douglas Hart
*Attorney, Agent, or Firm*—Knobbe, Martens, Olson & Bear LLP

[57] ABSTRACT

A motorcycle having a secondary air supply for delivering air to the exhaust ports of the engine for assisting in exhaust treatment of the exhaust gases. Air is supplied through reed-type check valves which are positioned in a concealed portion of the motorcycle body for silencing noise. The conduit which connects the check valves to the exhaust ports extends vertically downwardly substantially throughout its length so that condensed liquids in the conduit will pass back to the exhaust port rather than accumulate in the conduit.

1 Claim, 10 Drawing Sheets

SECONDARY AIR SUPPLY SYSTEM FOR ENGINE

BACKGROUND OF THE INVENTION

This invention relates to a secondary air supply system for an engine and more particularly to an improved arrangement for assisting in the cleaning of the exhaust gases of an internal combustion engine.

It has been acknowledged that the addition of a supply of secondary air to the exhaust system can be helpful in reducing the emission of unwanted exhaust gas constituents. If the secondary air is added at a place close enough to the exhaust port and where the exhaust gases still have a high temperature, the added air can complete the combustion of any unburned hydrocarbons and also can convert carbon monoxide into carbon dioxide.

One way in which such secondary air is supplied is through the use of an air bleed passage that will supply air to the exhaust port in proximity to the exhaust valve. In order to preclude reverse flow through the secondary air passages, there are normally provided the one way check valves that permit air to flow into the exhaust system but will not permit the exhaust gases to escape to the atmosphere.

As is well known, these check valves are sensitive to temperature and, therefore, it is normally the practice to position the check valve at some distance from the actual exhaust port. By so spacing the check valve, it can be protected from the heat of the engine exhaust. However, this also gives rise to a rather large volume in which air may become trapped and which is at a lower temperature than the exhaust gases. The exhaust gases contain a large amount of water and also hydrocarbons in vapor form and this water can condense in the secondary air supply system between the check valve and the exhaust port. In some situations the condensed vapor may even reach the check valve. This presents obvious problems of potential corrosion.

It is, therefore, a principal object of this invention to provide an improved secondary air supply system for an engine. It is a further object of this invention to provide an engine secondary air system wherein the check valve that controls the flow through the secondary air passage is protected from the heat and the arrangement is such that condensed vapors cannot remain in the air supply conduit.

It should be readily apparent that the use of check valves for controlling the flow of secondary air also presents a potential noise problem. That is, when these valves rapidly open and close they can emit noise which may be objectionable. This problem is particularly acute with certain types of open vehicles like motorcycles wherein the engine is exposed and wherein the air system and check valve may not be placed at a great distance from the rider.

It is, therefore, a still further object of this invention to provide an improved secondary air system for a vehicle wherein the check valves are positioned so that the noise that they emanate will reach the rider.

SUMMARY OF THE INVENTION

A first feature of this invention is adapted to be embodied in an internal combustion engine having an induction system and an exhaust system. A conduit is provided for supplying secondary air to the exhaust system. A check valve is positioned in this conduit at a point spaced from the exhaust system so as to permit air to flow into the exhaust system but preclude the exhaust gases from flowing to the atmosphere through the air supply system. In accordance with this feature of the invention, the portion of the conduit extending from the check valve to the exhaust system is disposed in a downwardly inclined fashion so that any liquids condensed in the conduit will flow back into the exhaust system.

Another feature on the invention is also adapted to be embodied in an internal combustion engine having a secondary air supply system for supplying secondary air to the exhaust gases. The secondary air system employs a check valve and this check valve is positioned within a portion of the body of the associated vehicle powered by the engine for reducing the emanation of noises to the occupants.

DETAILED DESCRIPTION OF THE PREFERRED EMBODIMENTS OF THE INVENTION

Figure 1:
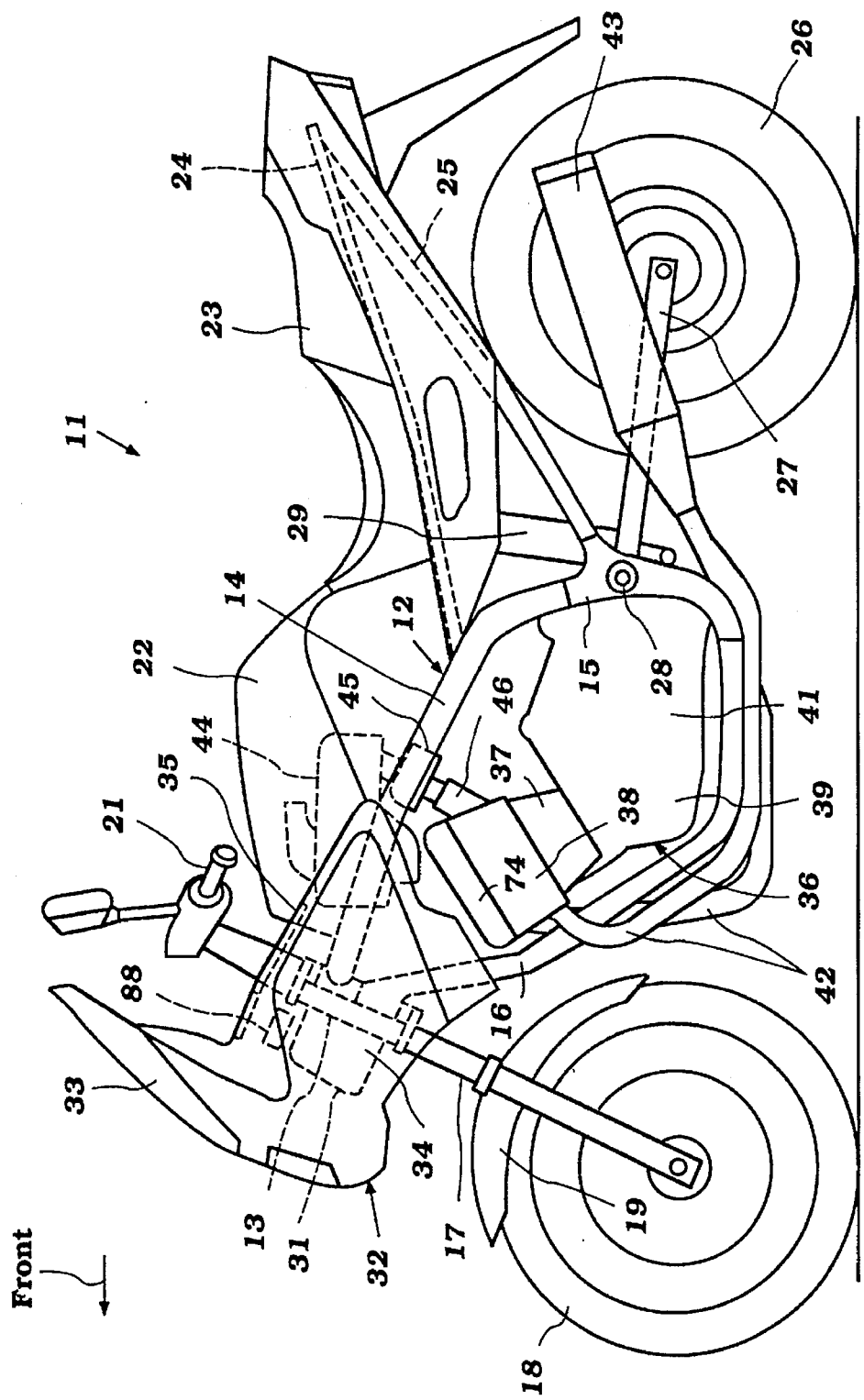
FIG. 1 is a side elevational view of a motorcycle constructed in accordance with an embodiment of the invention.

Referring now in detail to the drawings and initially to FIG. 1, a motorcycle constructed in accordance with an embodiment of the invention is illustrated and is identified generally by the reference numeral 11. The invention is described in conjunction with a motorcycle because certain features of the invention, particularly the placement and silencing of the check valves for the secondary air supply system, have particular utility in vehicles of the type such as motorcycles. This is because the generally open and exposed nature of the running gear of a motorcycle presents the noise problems which are solved in accordance with a feature of the invention. It will be readily apparent, however, how the invention can be applied in conjunction with a large other variety of applications for internal combustion engines, including, but not limited to, motor vehicles.

The motorcycle 11 is comprised of a frame assembly, indicated generally by the reference numeral 12. The frame assembly 12 is of the tubular type and includes a head pipe 13 from which a pair of main pipes 14 extend downwardly and rearwardly. These main pipes 14 terminate at their rear and lower ends in rear brackets 15.

Down tubes 16 extend also downwardly and rearwardly from the head pipe 13 and terminate at their lower and rearward ends in connections to the rear brackets 15.

A front fork 17 is dirigibly supported by the head pipe 13 in a known manner. The lower end of the front fork 17 carries a wheel 18 by means which may include a suspension system. A fender 19 is fixed to the front fork 17 and overlies the front wheel. A handlebar assembly 21 is affixed to the upper end of the front fork 17 above the head pipe 13 and forwardly of a seat 22 for operation by a rider seated thereupon.

The seat 22 and a rear passenger's seat 23 are carried by a pair of rearwardly extending seat rails 24. The seat rails 24 are further supported by seat pillars 25 that are connected to the rear brackets 15 and the seat rails 24.

A rear wheel 26 is journaled at the rear end of a trailing arm 27 beneath the rear seat 23. The trailing arm 27 is pivotally connected by means of a pivot joint 28 to the frame brackets 15 for suspension movement of the rear wheel 26. This suspension movement is dampened by a spring and shock absorber assembly 29 that is loaded between the trailing arm 27 and the frame assembly 12 in any known manner.

A forward sub-frame assembly 31 is connected to the head pipe 13 and carries a front cowling or body portion 32. A windshield 33 is carried at the upper end of the front body portion and cowling 32. This front body portion has a pair of rearwardly extending parts 34 that extend along and outwardly of the front of the seat 22 so as to afford protection for the rider's legs and to shield the lower portion of the rider's body from the air flow.

A dash panel 35 is fixed to extend across the body portion 34. This panel 35 may carry a plurality of instruments to supply operational and other information to the rider.

A propulsion unit, indicated generally by the reference numeral 36, is mounted in the frame assembly 12 and provides a source of power for driving the rear wheel 26. The propulsion unit 36 includes an internal combustion engine that includes a cylinder block 37 which will be described later in more detail to certain of the remaining figures and to which a cylinder head 38 is affixed. The engine is provided with a crankcase assembly 39 which, in accordance with motorcycle practice, includes a change speed transmission 41 which drives a drive shaft (not shown) for driving the rear wheel 26 through either a drive chain or drive shaft.

Continuing to refer primarily to FIG. 1, the propulsion unit 36 is provided with an exhaust system that includes a plurality of exhaust pipes 42 that are connected to the forwardly facing exhaust ports of the engine. These exhaust pipes 46 extend downwardly and rearwardly and are collected in either one or a pair of mufflers 43 which may be disposed on one or both sides of the rear wheel 26. The mufflers 43 discharge the exhaust gases from the propulsion unit 36 to the atmosphere.

The propulsion unit 36 also includes an air induction and charge forming system which is comprised of an air inlet and silencing device 44 which is positioned beneath the seat 22 and which will be described later in more detail by reference to other figures. This air inlet and silencing device 44 delivers air to a plurality of charge formers such as carburetors 45 which, in turn, discharge to the intake ports of the cylinder head 38 through an intake manifold The construction of the motorcycle 11 as thus far described may be considered to be conventional and, for that reason, those portions of the motorcycle which are conventional will not be described further except insofar as they may relate to the portions which deal with the invention.

Figure 2:
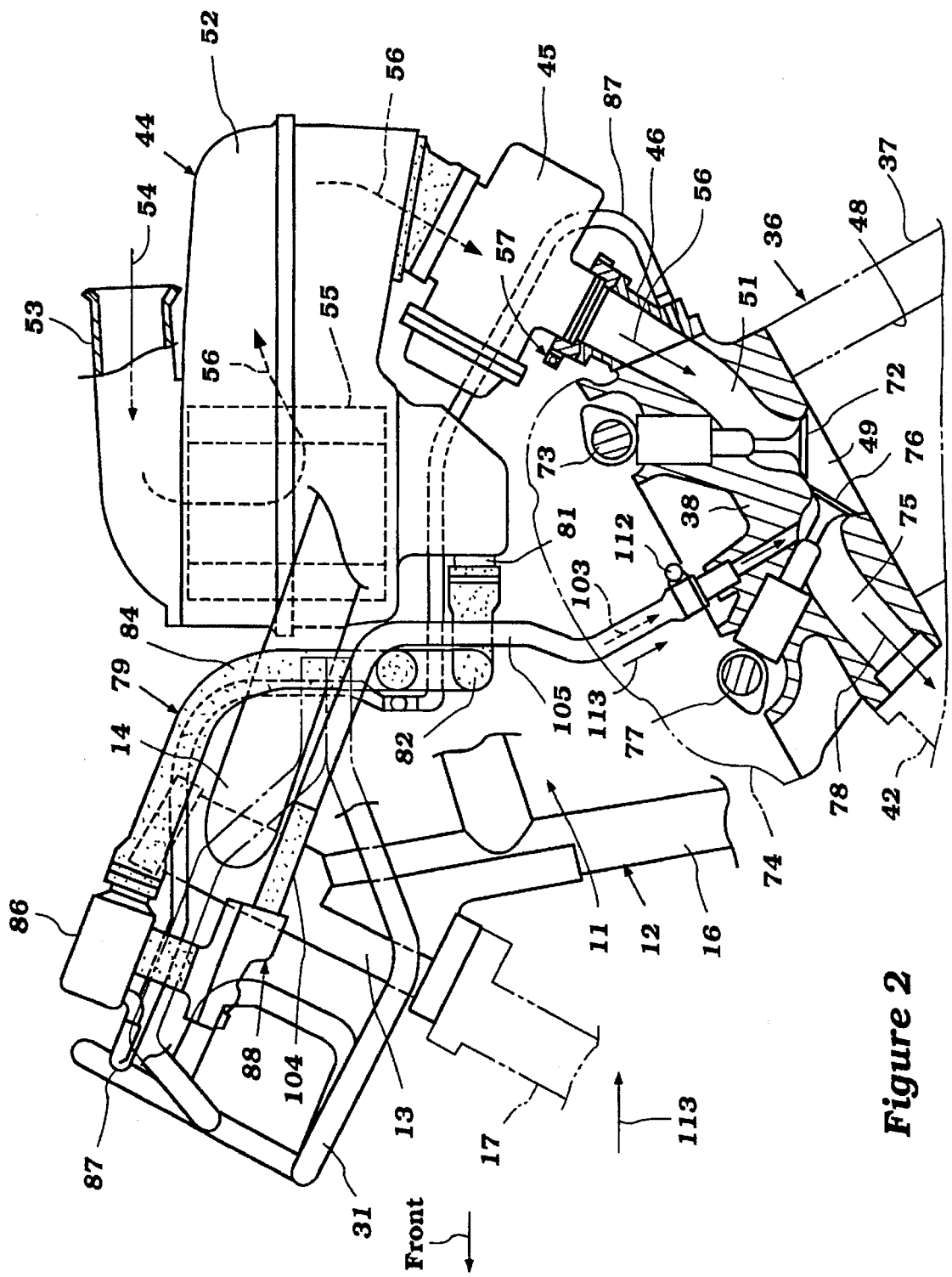
FIG. 2 is an enlarged view of the motorcycle showing primarily the engine induction and exhaust systems as well as the secondary air supply system for the exhaust system, with portions broken away and shown in sections.

Referring now in detail primarily to FIG. 2, the propulsion unit 36 and specifically the internal combustion engine portion of it, is depicted as being of the four cylinder in-line type. The cylinder block 37 is mounted in the frame assembly 12 so as to extend transversely from one side to the other. The cylinder block 37 is also inclined slightly forwardly and defines four cylinder bores 48 in which pistons (not shown) are positioned. These pistons are connected in a known manner to a crankshaft formed in the crankcase assembly 39 which drives the change speed transmission 41 previously referred to through a clutch in a well known manner. The cylinder head 38 is affixed to the cylinder block 36 and has individual recesses 49 associated with each cylinder bore 48 to form with the cylinder bores and the pistons the combustion chamber of the engine.

As previously noted, the intake side of the engine is the rear side and intake ports 51 extend through the cylinder head 38 from the combustion chamber recesses 49 to the intake manifold 46. This receives the charge from the induction system. As has been previously noted, this consists of the air inlet silencing and cleaning device 44, the carburetors 45 and the intake manifolds 46.

Figure 3:
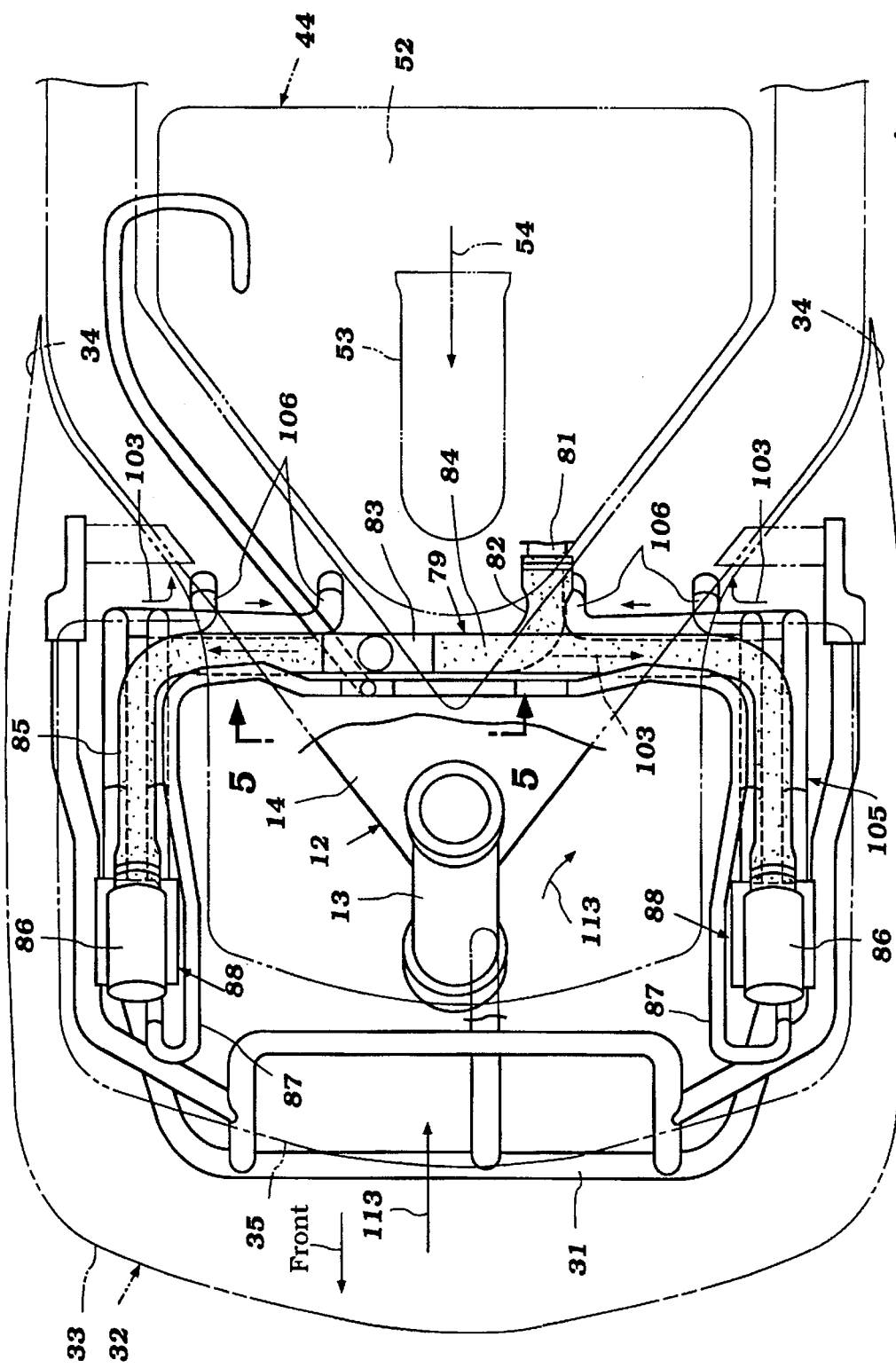
FIG. 3 is a top plan view of the construction shown in FIG. 2 with only a portion of the frame and the secondary air system being shown in solid lines and the remaining components shown in phantom.

This structure will be described in more detail by reference to FIG. 2 and it should be noted that FIG. 3 also shows the air inlet device 44 but primarily in phantom. The inlet device 44 includes an outer housing assembly 52 having a rearwardly facing air inlet tube 53 through which atmosphere is drawn by the direction indicated by the arrow 54. A filter element 55 is mounted within the housing 52 and through which all of the inducted air passes. This air then flows in the direction of the arrows 56 into the carburetors 45 for charge forming therein. Although the invention is described in conjunction with carbureted engines, it will be readily apparent to those skilled in the art that other charge forming systems may be employed.

Figure 7:
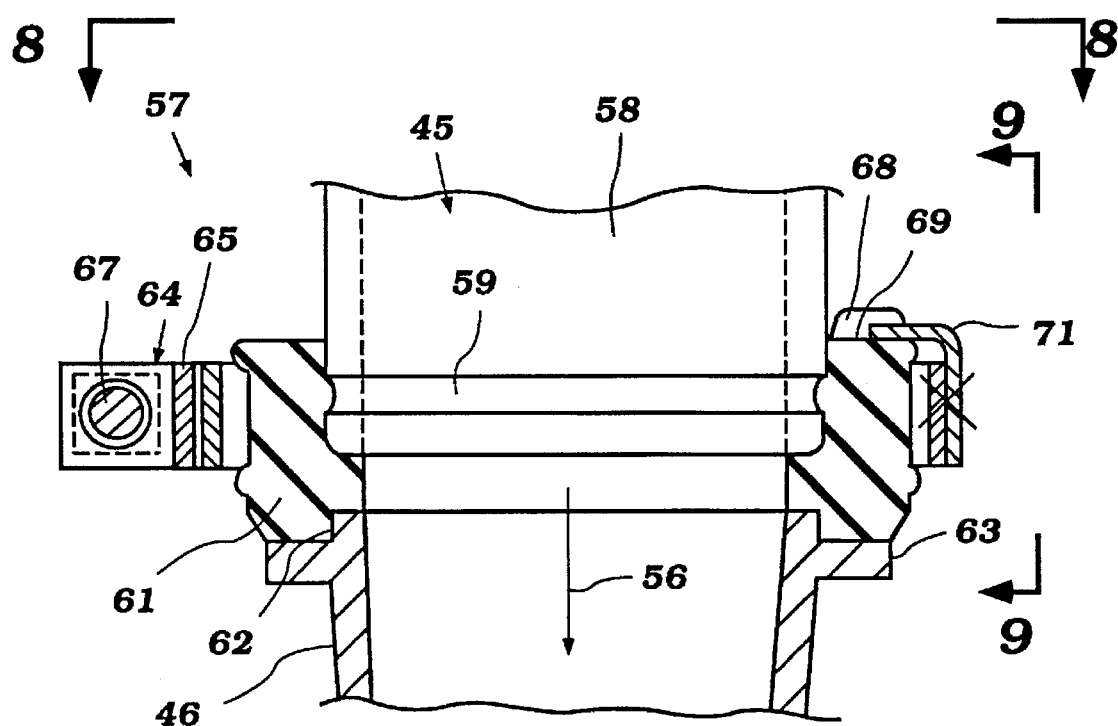
FIG. 7 is an enlarged cross-sectional view showing one of the conduit connections employed in the system.
Figure 8:
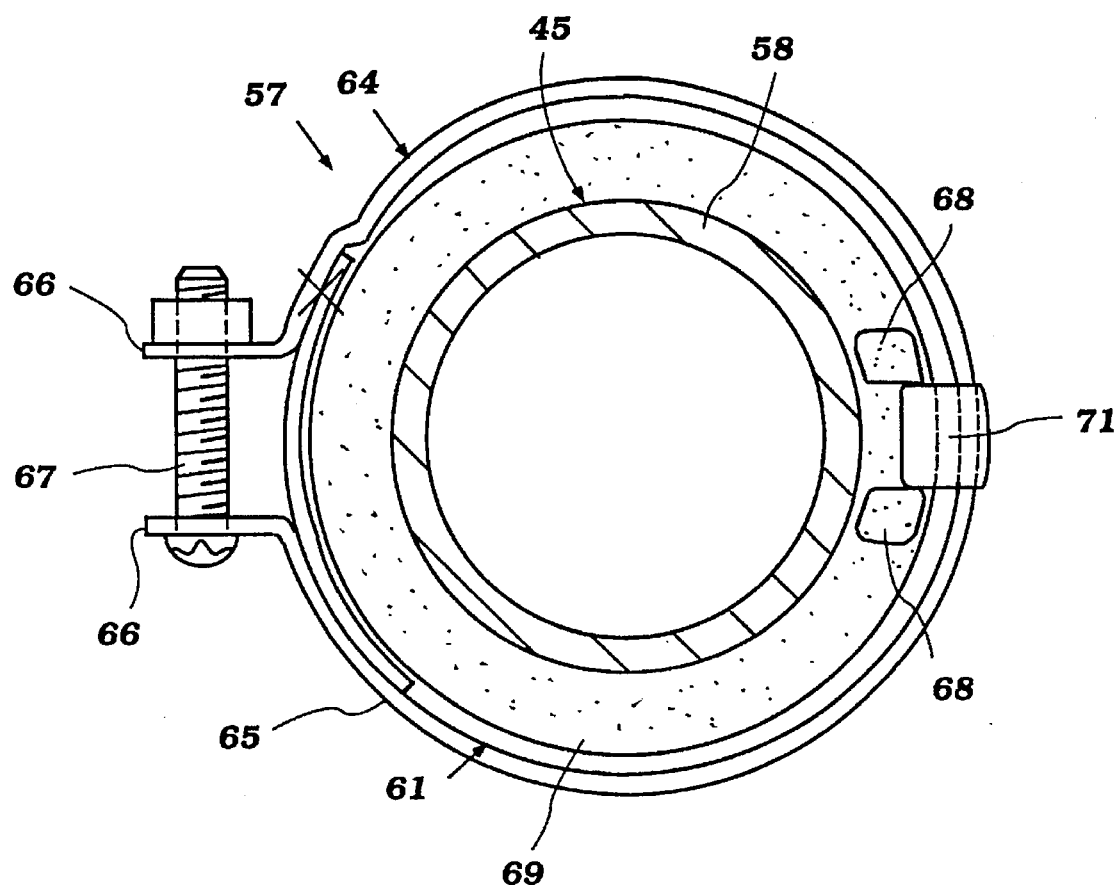
FIG. 8 is a cross-sectional view taken along the line 8—8 of FIG. 7.
Figure 9:
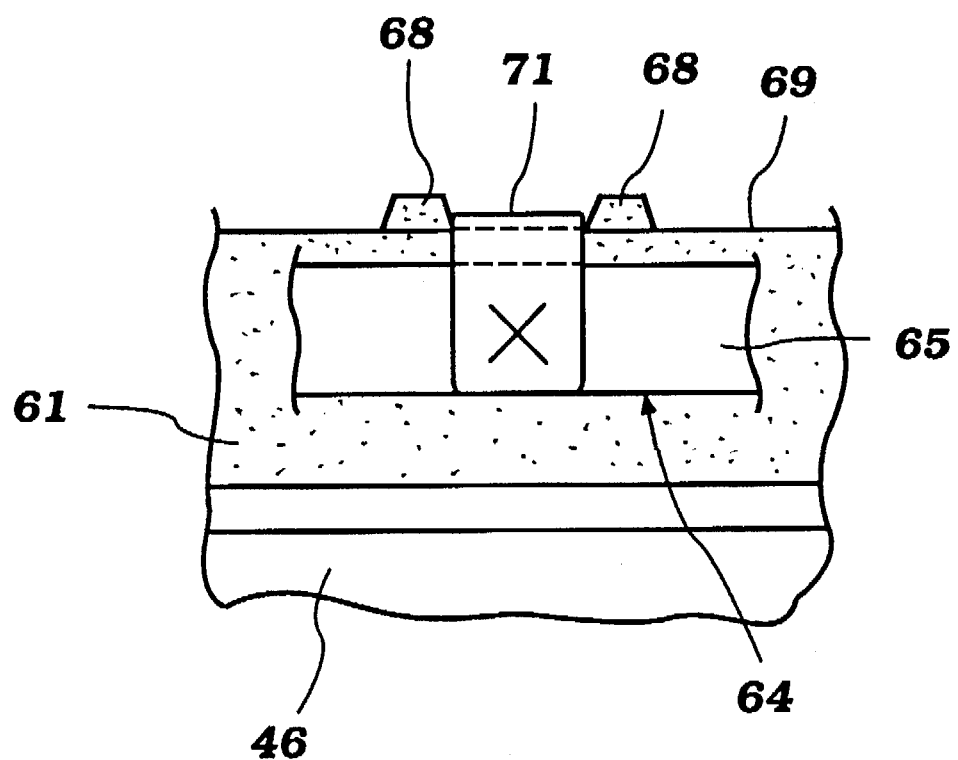
FIG. 9 is a view looking in the direction of the line 9—9 of FIG. 7.

The carburetors 45 are connected by means of hose-type connectors, indicated generally by the reference numeral 57 to the manifolds 46. These connectors 57 have a structure, preferably as shown in FIGS. 7–9 and will now be described by particular reference to those figures.

It will be seen that the carburetors 48 have a generally cylindrically configured discharge end 58 in which a groove 59 is formed. An elastic ring 61 is received around this portion 58 and over a similar shaped flange portion 62 of the manifold 46. The manifold portion 62 defines an outwardly extending rib 63 on which the elastic ring 61 is positioned. A hose-type clamp 64 is provided for affixing the elastic ring 61 to the carburetor discharge end 58 and the manifold flange 62. This clamp 64 is comprised of a band 65 that is formed from a metallic material and which has out-turned ends 66 that receive a threaded fastener 67 for applying a tightening compressive force on the bands 65 and the elastic ring 61.

To retain the clamp 64 in the desired position, the elastic ring 61 is provided with a pair of upstanding lugs 68. These lugs extend from an upper surface 69 of the ring 61 and are formed integrally with it. A metallic tab 71 is affixed, as by spot welding, to the clamp band 65 and is trapped between these lugs 68 so as to hold the clamp 64 in the desired circumferential position wherein the locking fastener 67 may be easily manipulated.

Referring again to FIG. 2, the thus connected charge forming system supplies its charge to the cylinder head intake passages 51. Intake valves 72 are slidably supported in a known manner in the cylinder head 38 and control the opening and closing of the intake passages 51 and their communication with the combustion chamber 49. The intake valves 72 are operated by means of an overhead mounted intake camshaft 73 which is, as known in the art, driven at one-half crankshaft speed by a suitable timing mechanism.

The intake camshafts 73 are rotatably journaled in the cylinder head assembly 38 in any known manner in a cam chamber thereof. This cam chamber is closed by a cam cover 74 that is affixed in a known manner to the cylinder head 38.

It has been previously noted that the exhaust pipes 42 are connected to the exhaust ports of the engine and one of these exhaust ports appears in FIG. 2 and is identified generally by the reference numeral 75. Like the intake passages 51, the flow through the exhaust port 75 is controlled by exhaust valves 76 mounted in the cylinder head 38 in a known manner. The exhaust valves 76 are operated by means of an exhaust camshaft 77 which is also rotatably journaled in the cylinder head cam cover 74 aforenoted. The exhaust camshaft 77 is also driven in any suitable manner at one-half crankshaft speed, as is well known in this art.

The exhaust gases flow from the combustion chambers 49 in the direction indicated by the arrow 78 in FIG. 2. In order to insure cleanliness of the exhaust gases and particularly so as to remove hydrocarbons and carbon monoxide, a secondary air system, indicated generally by the reference number 79, is provided for supplying air to the exhaust ports 75 adjacent the exhaust valves 76 under at least some running conditions. This secondary air is derived from the air which has been passed through the air filter 55 and which is thus cleaned and silenced by the air inlet device 44.

Figure 5:
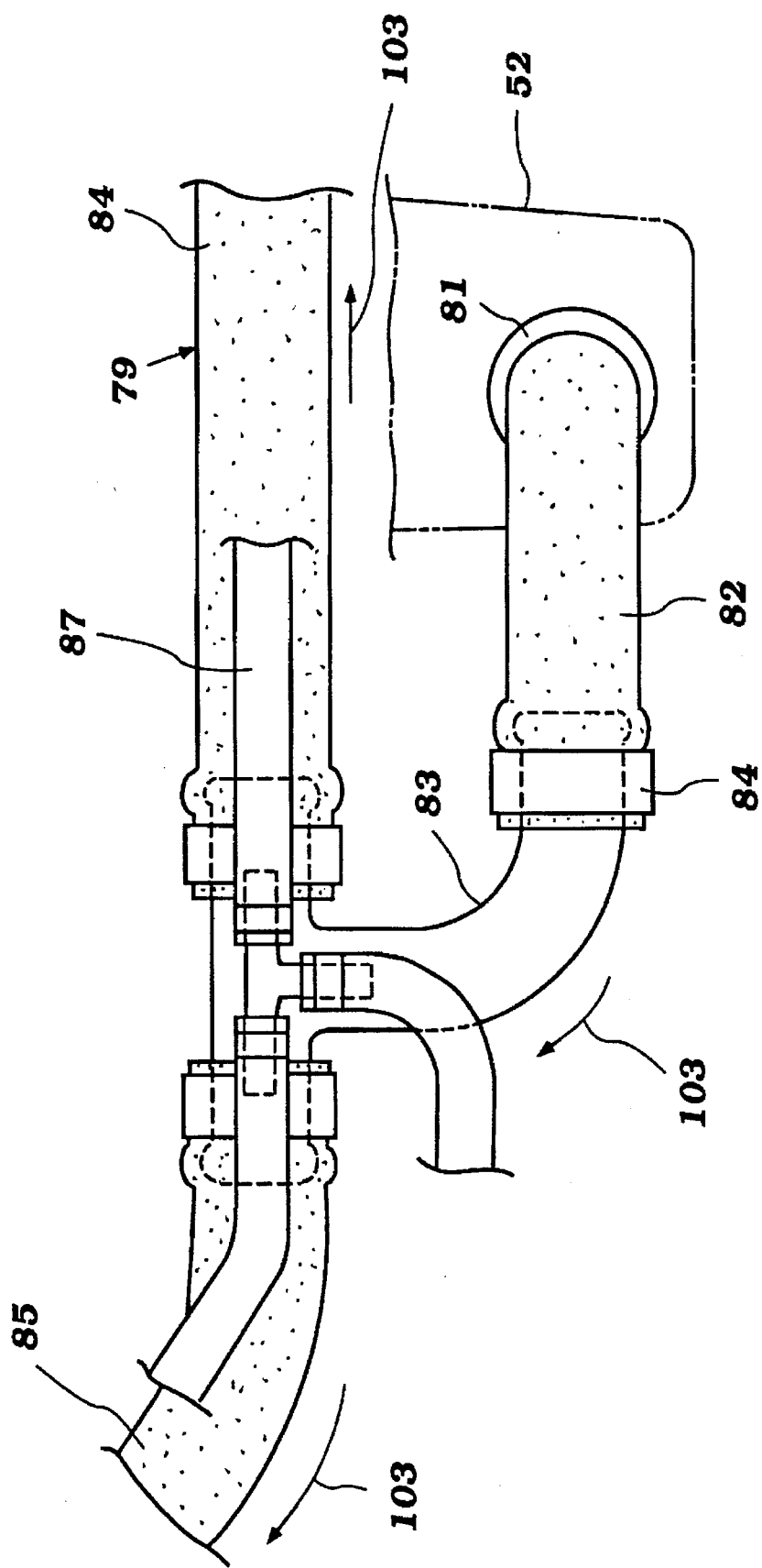
FIG. 5 is a front elevation view of a portion of the secondary air manifolding arrangement looking in the direction of the line 5—5 of FIG. 3.

For this purpose, the lower portion of the outer housing 52 is provided with an air supply nipple 81 onto which a first generally L-shaped hose 82 is slipped and held by a suitable clamp. As best seen in FIG. 5, the hose 82 is, in turn, connected to a T-fitting 83 by means including a hose clamp 84. The T-fitting 83 is connected to a pair of main feeder hoses 84 and 85, each of which extends to a respective side of the motorcycle frame 12 in an upward and forward direction. Each of these hoses 84 and 85 is connected to a respective shutoff valve 86.

The shutoff valves 86 are provided so as to cut off the flow of secondary air to the exhaust port 71 under certain running conditions such as at idle or under high load, high speed conditions. In order to sense these running conditions, a vacuum sensing hose 87 is connected to the intake manifold 46 downstream of the carburetors 45. As is well known, under high speed, high load conditions, intake manifold vacuum will be low and absolute pressure will be relatively high and close to atmospheric. Under this condition, the valves 86 will close and no secondary air will be supplied to the exhaust ports 75.

The shutoff valves 86, in turn, supply air to check valve assemblies, indicated generally by the reference numeral 88 which are positioned below them and to the front and upper portion of the motorcycle and within the body cowling 32 at a well forward position. As a result of this placement, the check valves 88 with be shielded by the dash panel 35 and body cowling 33 from the rider and passenger, if any. Also, this high position of the check valves 88 preserves another function, which will be described shortly.

Figure 4:
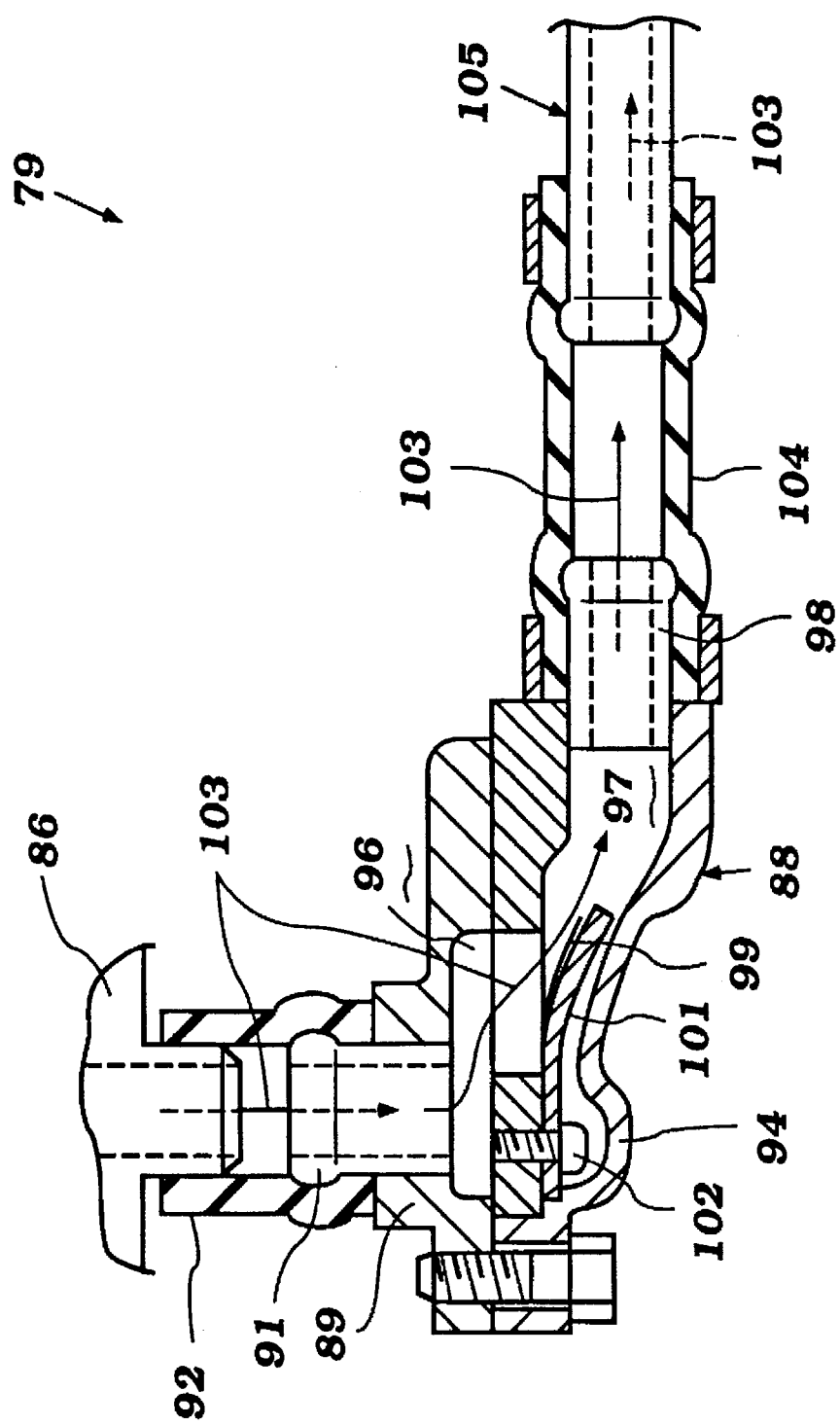
FIG. 4 is an enlarged cross-sectional view showing one of the flow controlling check valves.

The construction of the check valves 88 may be best understood by reference to FIG. 4 where they are shown in cross section. Each check valve 88 is comprised of an upper housing piece 89 having an inlet fitting 91 that is connected by a hose 92 to the outlet of the shutoff valves 86. A valve plate 93 is trapped by the cover plate 89 and a lower plate 94 and has a flow opening 95 that extends between an upper chamber 96 and a lower chamber 97. The lower chamber 97 communicates with an outlet nipple 98.

A read-type valve element 99 is held between a stopper plate 101 and the valve plate 93 by means of threaded fasteners 102. The valve element 99 when opened as shown in FIG. 4 will permit flow in the direction of the arrows 103 to the exhaust ports 75 through a system which will be described next. The stopper plate 101, as is well known in this art, controls the degree of opening of the read valve element 99 and as well as retaining the read valve element 99 in position. When the exhaust pressure is higher than atmospheric pressure, the read valve element 99 will close and reverse flow in the direction opposite to the arrows 103 will be precluded.

Figure 6:
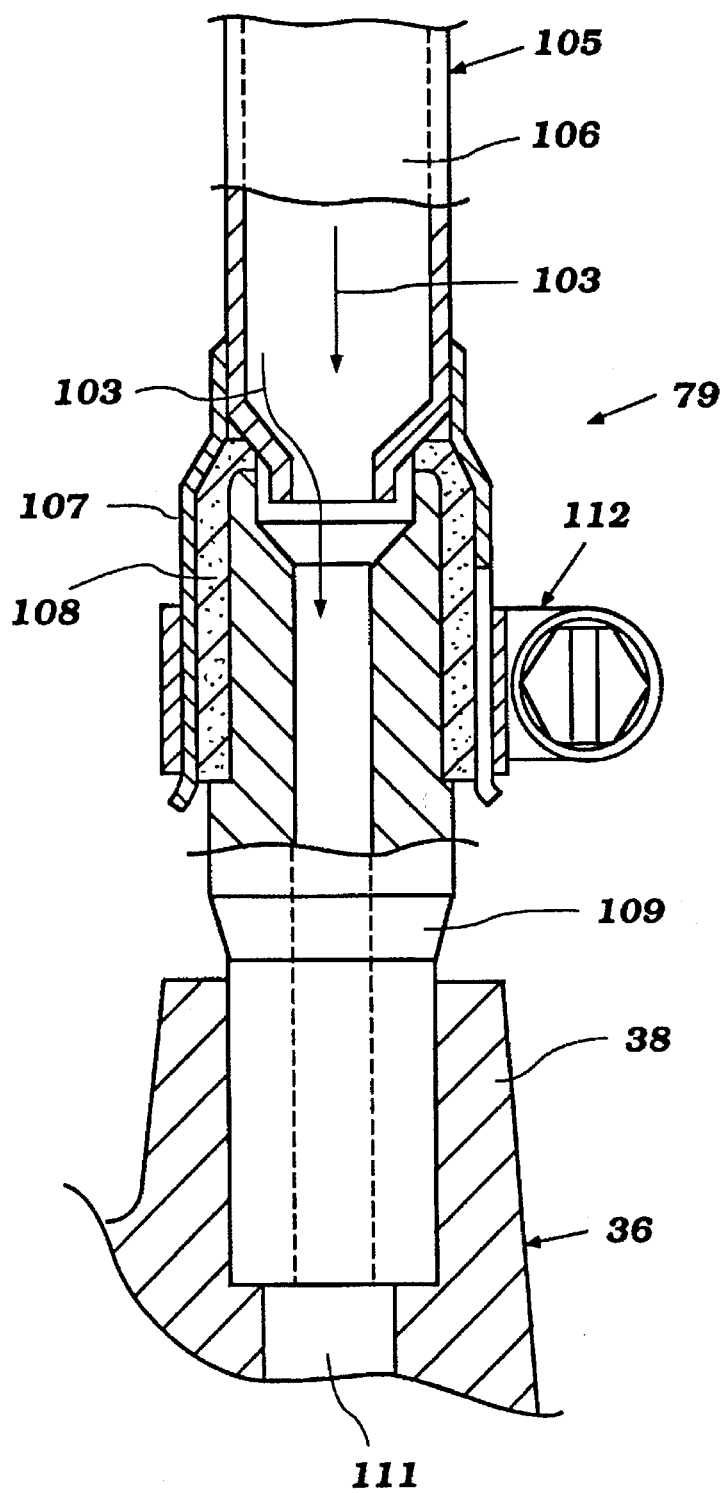
FIG. 6 is an enlarged cross-sectional view showing the connection by which the secondary air is delivered to the exhaust ports of the engine.

The nipple 98 is connected by a flexible hose 104 to a secondary air manifold 105. The secondary air manifold 105 is configured, as best seen in FIG. 2 so that it extends downwardly and rearwardly in a generally continuous manner and which branches into a pair of end portions 106 each of which serves a respective cylinder of the engine as shown in FIG. 6. Each section 106 has an enlarged slotted tubular end 107 that slides over an elastic sleeve 108 which is, in turn, received on the upper end of a secondary air supply nozzle 109. Each nozzle 109 is threaded into the cylinder head 38 in communication with a passageway 111 that extends through the cylinder head 38 and which terminates at the exhaust port 75. A hose-type fastener 112 affixes the bushings 107 of each manifold end 106 to the secondary air supply nipple 109.

It should be understood that there may be one check valve 88 provided for each cylinder or there may be one check valve that serves pairs of cylinders, depending upon the firing order of the cylinders. That is, if the firing order of the individual cylinders is sufficiently displaced, a single check valve 88 may serve more than one cylinder. If, however, the cylinders fire in close intervals or if other reasons dictate, an individual check valve 88 is provided for each cylinder.

However, it should be readily apparent that the described construction because of the downward inclination of the secondary air supply manifold 105 and the inclination of the check valves 88 is such that any exhaust gases which may flow in a reverse direction into the air system and cause condensation will present no problem. That is, because any liquid condensed from the flow of cooling air in the direction of the arrows 113 due to the motion of the motorcycle 11 will immediately flow back into the exhaust port 75 where they will be revaporized and treated by the air before discharge to the atmosphere.

Figure 10:
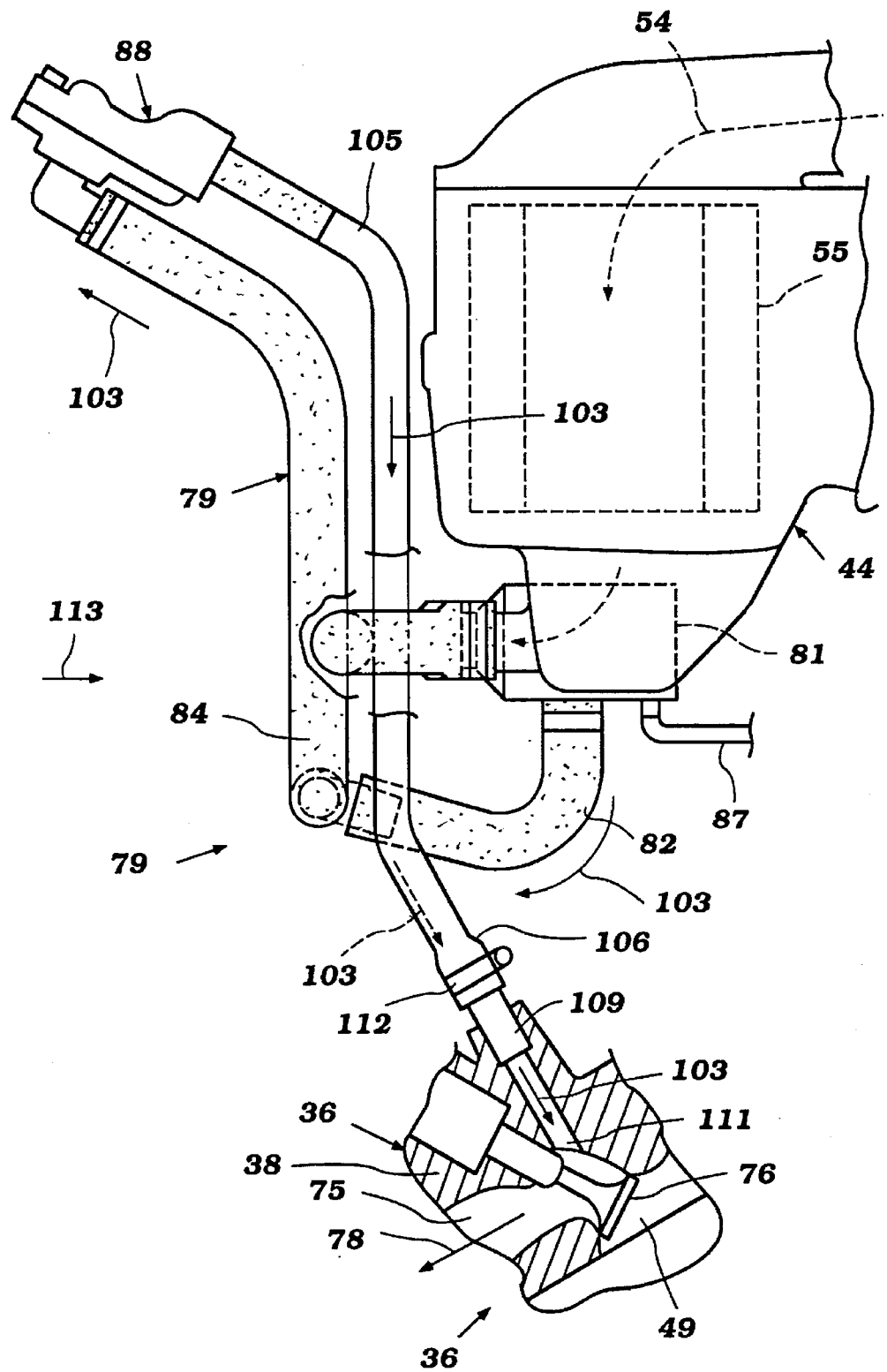
FIG. 10 is a view, in part similar to FIG. 2, and shows another embodiment of the invention.

FIG. 10 is another embodiment of the invention which differs from the embodiment as thus far described only in the location of the cutoff valve 86. In fact, in this embodiment, a single cutoff valve may be employed and this is disposed between the outlet of the air cleaner and silencer assembly 44 and the T connection 83. In this way, a single cutoff valve serves all of the reed-type check valves. In all other regards, this embodiment is the same and, therefore, all components which are the same are identified by the same reference numerals and further description is not believed to be necessary.

From the foregoing description, it should be readily apparent that the described embodiments of the invention provide a very effective air treatment system for the exhaust gases wherein supplemental air may be introduced and the check valves which are employed are positioned so that they will not be heated and will be remotely positioned from the cylinder head and exhaust port. However, this remote position does not present corrosion problems since the interconnecting conduits all extend in a downhill fashion so any liquid which may condense in the conduit will drain immediately back into the exhaust port. In addition, the reed valves are positioned concealed within the cowling and hence any noise which may emanate from them will not disturb the occupants of the vehicle. Of course, the foregoing description is that of preferred embodiments of the invention and various changes and modifications may be made without departing from the spirit and scope of the invention, as defined by the appended claims.

I claim:

1. A motorcycle having a frame, an internal combustion engine supported within said frame and having at least one exhaust port, an exhaust system for discharging exhaust gases from said exhaust port to the atmosphere, a protective cowling for said body, a check valve positioned within said protective cowling, and an air conduit extending from said check valve to said exhaust port for delivering air to said exhaust port.

* * * * *